United States Patent
Shewchuk et al.

(10) Patent No.: US 8,051,469 B2
(45) Date of Patent: *Nov. 1, 2011

(54) SECURELY ROAMING DIGITAL IDENTITIES

(75) Inventors: John P. Shewchuk, Redmond, WA (US);
Arun K. Nanda, Sammamish, WA (US);
Donald F. Box, Bellevue, WA (US);
Douglas A. Walter, Issaquah, WA (US);
Hervey O. Wilson, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/620,444

(22) Filed: Nov. 17, 2009

(65) Prior Publication Data
US 2010/0064361 A1 Mar. 11, 2010

Related U.S. Application Data

(63) Continuation of application No. 11/222,912, filed on Sep. 9, 2005, now Pat. No. 7,640,579.

(51) Int. Cl.
*G06F 7/04* (2006.01)
(52) U.S. Cl. .......................................................... 726/5
(58) Field of Classification Search .................. None
See application file for complete search history.

(56) References Cited

U.S. PATENT DOCUMENTS

| | | | |
|---|---|---|---|
| 6,292,895 B1 | 9/2001 | Baltzley | 713/168 |
| 6,912,659 B2 | 6/2005 | Labaton | 713/176 |
| 2003/0074660 A1 | 4/2003 | McCormack et al. | 725/2 |
| 2004/0030887 A1 | 2/2004 | Harrisville-Wolff et al. | 713/155 |
| 2004/0078571 A1* | 4/2004 | Haverinen | 713/168 |
| 2004/0149820 A1 | 8/2004 | Zuili | 235/384 |
| 2005/0039016 A1 | 2/2005 | Aissi et al. | 713/176 |
| 2005/0076198 A1 | 4/2005 | Skomra et al. | 713/156 |
| 2005/0149759 A1 | 7/2005 | Vishwanath et al. | 713/201 |

FOREIGN PATENT DOCUMENTS

| EP | 1 542 117 A1 | 6/2005 |
|---|---|---|
| WO | WO 03/029942 A2 | 4/2003 |

OTHER PUBLICATIONS

Entrust, *Entrust TruePass, Features and Benefits*, http://www.entrust.com/internet-security-software/features, retrieved Sep. 9, 2005, 3 pages.

(Continued)

*Primary Examiner* — Brandon Hoffman
(74) *Attorney, Agent, or Firm* — Merchant & Gould P.C.

(57) ABSTRACT

A cryptographic session key is utilized to maintain security of a digital identity. The session key is valid only for a limited period of time. Additional security is provided via a bimodal credential allowing different levels of access to the digital identify. An identity token contains pertinent information associated with the digital identity. The identity token is encrypted utilizing public-key cryptography. An identifier utilized to verify the validity of the digital identity is encrypted with the cryptographic session key. The encrypted identity token and the encrypted identifier are provided to a service for example. The service decrypts the encrypted identity token utilizing public key cryptography, and decrypts, with the cryptographic session key obtained from the identity token, the encrypted identifier. If the identifier is determined to be valid, the transaction proceeds normally. If the identifier is determined to be invalid, the transaction is halted.

20 Claims, 7 Drawing Sheets

OTHER PUBLICATIONS

Digital Signature Trust, *Roaming Digital Certificates, A New Type of Standard Assurance Certificate for the State of Washington PKI*, http://www.digsigtrust.com/state/wa/swa-offerings-standard-roaming.html, retrieved Sep. 9, 2005, 2 pages.

Betrusted, *UniCERT Advanced Modules, User Roaming*, http://www.betrusted.com/products/unicert/advancedmodules/roaming.asp, retrieved Sep. 9, 2005, 2 pages.

Arcot Systems, Inc., *Making Software-Only Strong Authentication a Reality*, http://www.arcot.com/arcotid.html, retrieved Sep. 9, 2005, 2 pages.

USPTO Non-Final Office Action dated Feb. 25, 2009, cited in U.S. Appl. No. 11/222,912; 10 pages.

Amendment and Response to Non-Final Office Action cited in U.S. Appl. No. 11/222,912, filed May 26, 2009; 14 pages.

USPTO Notice of Allowance and Fee(s) Due dated Aug. 17, 2009, cited in U.S. Appl. No. 11/222,912; 4 pages.

\* cited by examiner

SECURELY ROAMING DIGITAL IDENTITIES

RELATED APPLICATIONS

This application is a continuation application of U.S. patent application Ser. No. 11/222,912, entitled "SECURELY ROAMING DIGITAL IDENTITIES," filed on Sep. 9, 2005 (now U.S. Pat. No. 7,640,579), the entire disclosure of which is hereby incorporated herein by reference.

TECHNICAL FIELD

The technical field relates generally to computers and computing systems, and more specifically relates to maintaining the security of a digital identity.

BACKGROUND

Security is paramount when transferring personal information via a network, such as the Internet for example. The specific information provided over a network depends upon the transaction. For example, information provided to a lender when applying for a loan differs from information provided to a car rental agency when reserving a rental car. The information being provided represents the digital identity associated with the respective person. The person providing a digital identity typically desires the information to be secure. The security of digital identities is a concern when conducting transactions from public facilities, such as kiosks and wireless zones. In a kiosk, for example, a person finishing a transaction could walk away from the kiosk, and a third party might be able to access the digital identity and use it without authorization. In a wireless zone, third parties can monitor transactions.

SUMMARY

A cryptographic session key is utilized to maintain security regardless of the computing system in which a digital identity is being used. Security also is maintained when roaming from one computing system to another. The cryptographic session key is valid only for a time period determinable by the user of the digital identity. Different cryptographic session keys can be used to communicate with different parties. Additional security is provided by allowing a user to determine the level of access to attributes of the digital identity. For example, lesser access can be provided allowing access to metadata, such as a description, associated with an attribute (e.g., access to the metadata description "social security number," instead of the actual social security number). Or, a higher level of access can be provided allowing modification of an attribute (e.g., entering or changing a social security number). Access is granted in accordance with a bimodal credential, such as a pair of passwords for example. That is, a high level of access is granted when a first password is entered, or a lower level of access is granted when a second password is entered.

In an exemplary scenario, a user is requested to provide attributes associated with a digital identity (e.g., credit card number and date of birth). The requested attributes, a cryptographic session key, and a time stamp indicating the duration of the cryptographic session key are combined to form an identity token. The identity token is encrypted with a private key of a public-key cryptographic key pair. Also, an identifier or proof material, utilized to verify the validity of the digital identity, is encrypted with the cryptographic session key. The encrypted identity token and the encrypted identifier are sent to the requester. The requester decrypts the encrypted identity token with the respective public key of the public-key cryptographic key pair. The requester also decrypts, with the cryptographic session key obtained from the identity token, the encrypted identifier. If the identifier is determined to be valid, the transaction proceeds normally. If the identifier is determined to be invalid, the transaction is halted.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

To facilitate an understanding of the methods and devices for securely roaming a digital identity described herein, an exemplary scenario is provided. In the exemplary scenario, a user will purchase a book online via the Internet. The user will purchase the book from a computer terminal located in a public library. The user will send a request to the publisher of the book requesting to purchase the book. The publisher will send the user a request for specific information in order to complete the transaction. The user wants the information provided to the publisher to remain secure, even though the user is sending the information from a public location. The user does not want any information that is left behind in the terminal to be used by unauthorized persons.

Figure 1:
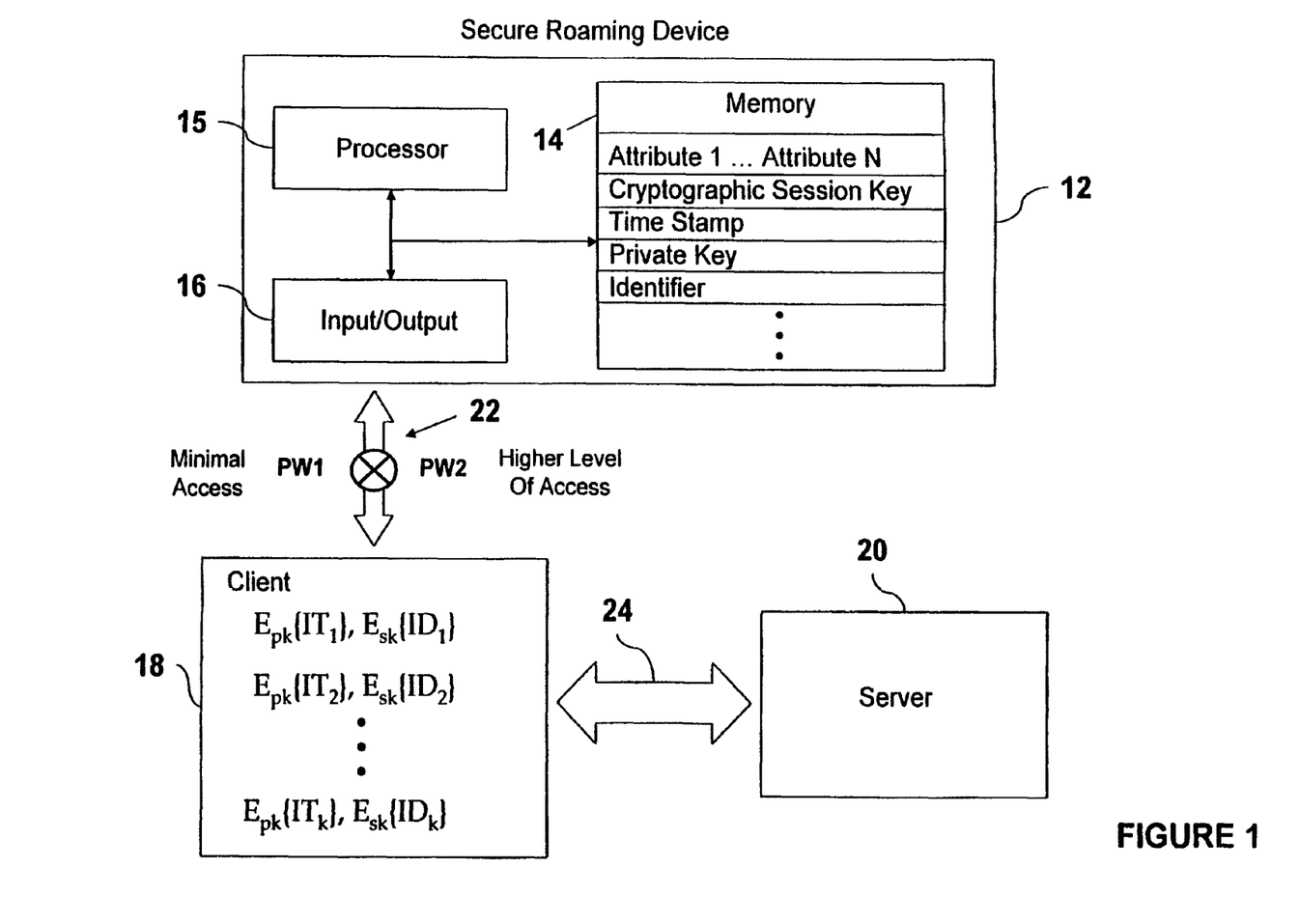
FIG. 1 is an illustration of an exemplary system for securely roaming a digital identity.

FIG. 1 is an illustration of an exemplary system for securely roaming a digital identity comprising a secure roaming device 12, a client processor 18, and a server processor 20. In accordance with the exemplary scenario above, the client processor 18 represent the terminal located in the library and the server processor 20 represents the publisher's server.

The secure roaming device 12 comprises a memory portion 14, a processor portion 15, and an input/output portion 16. The secure roaming device 12 can comprise any appropriate device comprising a memory portion 14 and an input/output portion 16 as described herein. For example, the secure roaming device 12 can comprise a flash memory device, a hard disk drive, a biometrically protected device, a portable memory device, a universal serial bus (USB) compatible device, a processor, a laptop computer, a personal digital assistant (PDA), a portable phone, or a combination thereof. The processor portion 15 is capable of performing cryptographic and programmatic computations. The processor portion 15 is capable of generating the cryptographic session key, the private key of a public-key pair, and the timestamp. The processor portion 15 also is capable of performing cryptographic operations such as encryption and decryption, for example.

As described above, the secure roaming device 12 can be implemented in the faun of a portable memory device, or the like. As such, functions performed by the processor 15, the memory portion 14, and the input/output portion 16 can be separate from functions performed by the client processor 18. Also, as described above, the secure roaming device 12 can comprise a laptop computer or the like. In such an embodiment, the laptop computer can be coupled to the client processor 18 or can be coupled to the server processor 20 via interface 24. Thus, it is envisioned that the secure roaming device 12 and the client processor 18 can be implemented in a single device, such as a laptop computer or the like. As such, the functions performed by the client processor 18, the processor portion 15, the input/output portion, and the memory portion 14 are distributed therein.

The memory portion 14 is capable of storing attributes associated with the digital identities. Attributes can include any appropriate information associated with a digital identity. Some examples of an attribute include a social security number, a credit card number, age, weight, medical information, financial information, personal information, a personal identification number (PIN), or a combination thereof. The memory portion 14 is capable of storing, among other things, attributes used to form various digital identities, the cryptographic session key, the time stamp, the private key of a public-key cryptographic key pair, and an identifier used to validate the identity token. The cryptographic session key can comprise any appropriate cryptographic key, for example a symmetric key, one of the keys of a public-key cryptographic key pair, or a combination thereof. The memory portion 14 also is capable of storing a time stamp indicative of the duration of the cryptographic session key. The time stamp can comprise any appropriate value for indicating the duration of the cryptographic session key. For example, the time stamp can comprise a clock time, after which the cryptographic session key expires. Alternatively, the time stamp can comprise a time representing the length of time for which the cryptographic session key is valid.

The memory portion 14 is capable of storing the identifier (e.g., proof material). The identifier can comprise any appropriate means for validating the digital identity. For example, the identifier can comprise a predetermined value and/or character. In another exemplary embodiment, the identifier can comprise a response to a challenge. And, as described in more detail below, the client processor 18 utilizes the cryptographic session key provided by the secure roaming device 12 to respond to the challenge. As is known in the art, prior to two entities communicating over a network, in accordance with various protocols, one entity can challenge another entity. The challenged entity provides a response that is determined in accordance with an algorithm that is known to both entities. For example, the response can comprise a random number generated from a seed determined in accordance with the commonly known algorithm. In an exemplary embodiment, the identifier can comprise this random number response to a challenge.

The memory portion 14 is capable of storing both modes of the bimodal credential. The bimodal credential can comprise any appropriate means for allowing one of two levels of access to information stored in the memory portion 14. For example, the bimodal credential can comprise two passwords. One password allows a lesser level of access to information stored in the memory portion 14, and the other password allows a higher level of access to information stored in the memory portion 14. In an exemplary embodiment, the lesser level of access allows read-only access (also referred to as safe access) to information stored in the memory portion 14, and the higher level of access allows management and modification of information stored in the memory portion 14. In an exemplary embodiment, when read-only access is allowed, the user does not have direct access to identity information stored in the memory portion 14 including the private key of the public-key cryptographic key pair. Rather, the user only can see metadata such as description of the identity attributes. For example, the user sees the description "social security number," rather than the actual value. The user can receive the identity information stored in the memory portion 14 as identity tokens encrypted for recipients of that information as approved by the user. However, if a higher level of access is allowed, the user has greater access to the identity information and is permitted to manage information stored in the memory portion 14. For example, during a higher level of access the user can perform functions such as add information, delete information, and change information, such as cryptographic keys, or a combination thereof.

The memory portion 14 is also capable of storing a private key of a public-key cryptographic key pair. Public key cryptography is known in the art. Any appropriate public key cryptographic system can be used, such as the known RSA cryptographic cipher, for example. A description of the RSA cryptography cipher is found in U.S. Pat. No. 4,405,829, entitled "Cryptographic Communications System and Method," which issued on Sep. 20, 1983, in the names of Rivest, Shamir, and Adleman. Public key cryptography uses a pair of keys. One key is used to encrypt and the other is used to decrypt. Knowledge of one key does not provide knowledge of the other key. Typically one key is kept secret, and thus called the private key. The other key typically is made public.

In accordance with the exemplary scenario, the secure roaming device 12 comprises a biometrically protected flash memory device. The user enters the library and connects the secure roaming device 12 to the client processor 18 via an interface 22. The interface 22 can comprise any appropriate interface. The interface 22 can comprise a wireless link, a hardwired interface, or a combination thereof. The user begins a transaction with the publisher by entering the publisher Web address into the client processor 18. The user is then connected to the publisher server (e.g., server processor 20) via an interface 24. The interface 24 can comprise any appropriate interface. The interface 24 can comprise a wireless link, a hardwired interface, or a combination thereof. The publisher sends a request for information to the user via the interface 24 and the client processor 18. The publisher's request contains a request for the user's credit card number, the user's date of birth, the user's mailing address, the user's residential zip code, the user's email address, and information pertaining to the specific book the user is ordering. In an exemplary embodiment, the client processor 18 receives a challenge from the server processor 20. In response to the received challenge, the client processor 18 generates a response in accordance with a predetermined algorithm.

The user then enters one mode of a bimodal credential via the client processor 18. For example, if the user knows that all the information requested by the publisher is in the memory portion 14, then the user can provide a first password (denoted as PW1 in FIG. 1) which will provide the requested information to the client processor 18 in the form of an encrypted identity token, but prohibits the user direct access to information in the memory portion 14, such as the private key of the public-key cryptographic key pair, and the attributes associated with the digital identity. Or, for example, if the user knows that the requested information is not in the memory portion 14, the user can enter a second password (denoted as PW2 in FIG. 1) to gain a higher level of access to the information in the memory portion 14 in order to make modifications.

If a higher level of access is selected, the user can download identity information such as the attributes, the private and public cryptographic key pair into the client processor 18 from the secure roaming device 12, modify the attributes as desired, and form the identity token. If a lesser level of access is selected, the needed identity attributes is fetched in the form of an encrypted identity token along with a cryptographic session key into the client processor 18 from the secure roaming device 12 without the user being able to modify any attributes.

Figure 2:
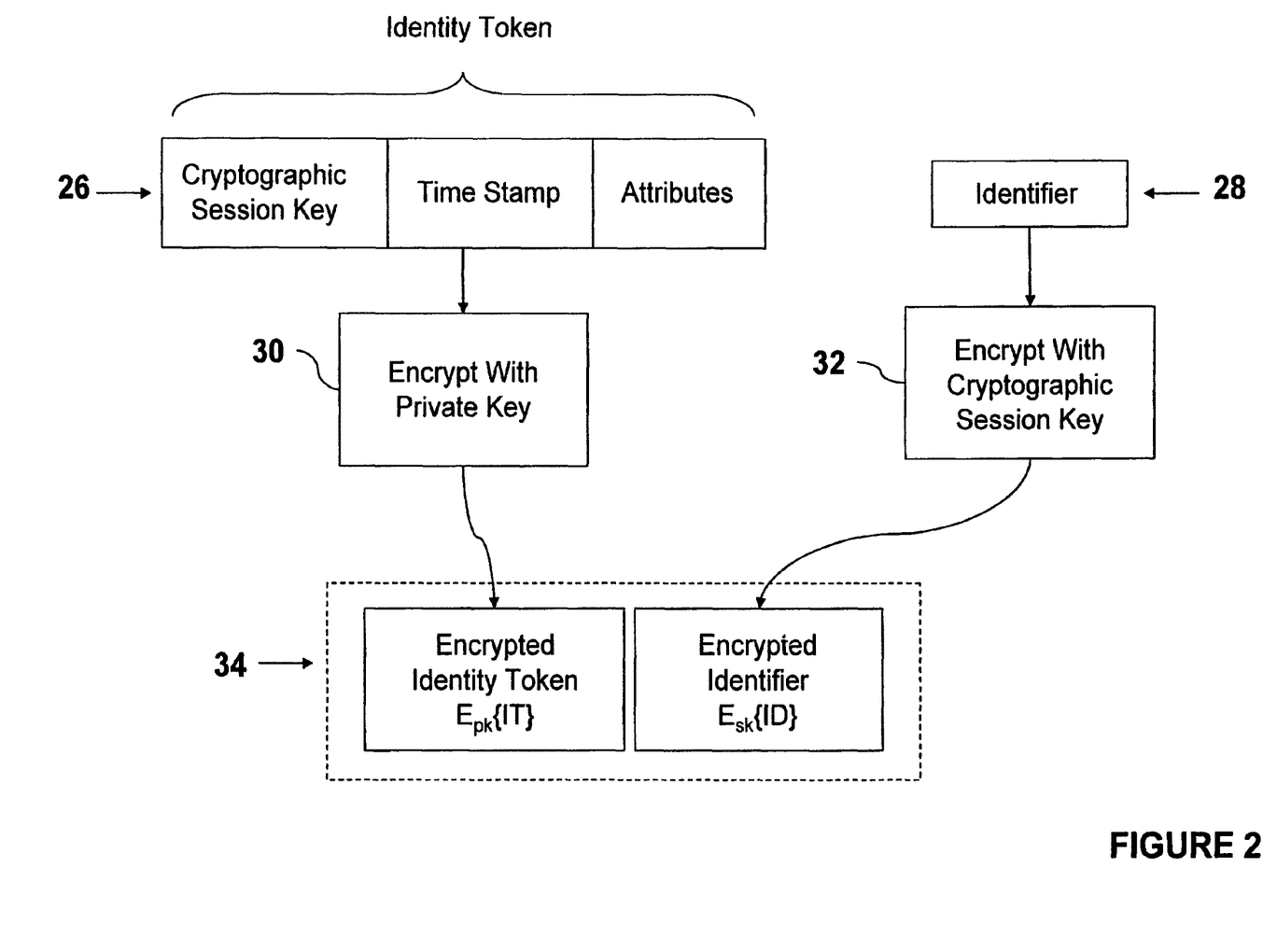
FIG. 2 is an illustration depicting an exemplary formation and encryption of an identity token and an identifier.

The identity token and the identifier are encrypted. FIG. 2 is an illustration depicting an exemplary formation and encryption of an identity token 26 and an identifier 28 in preparation for transmission of the message 34 to the server processor 20. The identity token 26 comprises the cryptographic session key, the time stamp, and attributes of the digital identity. In accordance with the exemplary scenario, the attributes comprise the user's credit card number, the user's date of birth, the user's mailing address, the user's residential zip code, and the user's email address. The identity token 26 is encrypted utilizing the private key of a public-key cryptographic key pair as depicted in block 30. The identity token encrypted with the private key is denoted as $E_{pk}\{IT\}$ in FIG. 2. The identifier 28 is encrypted utilizing the cryptographic session key as depicted in block 32. Cryptographic session key used to communicate with different parties can be cryptographically unrelated. The use of cryptographically unrelated session keys helps maintain security. For example, if a cryptographic session key being used with one party is compromised, the cryptographic session keys being used with other parties are still secure. The identifier 28 can comprise a predetermined identifier of which the intended receiver is aware. In accordance with the exemplary scenario, that is the publisher knows the identifier, and thus can verify its validity upon receipt. Or, the identifier can comprise a response to a challenge as described above. The identifier encrypted with the session key is denoted as $E_{sk}\{ID\}$ in FIG. 2. The encrypted identity token, $E_{pk}\{IT\}$, and the encrypted identifier, $E_{sk}\{ID\}$, are formed into a message 34. In accordance with the exemplary scenario, the message 34 is transmitted to the publisher's server (e.g., server processor 20).

Referring again to FIG. 1, the user can conduct transactions with several services. Accordingly, the user can create several identity tokens. Each identity token and respective identifier are encrypted as described above. The ability to form multiple encrypted identity tokens and encrypted identifiers is depicted in block 18 of FIG. 1 showing messages 1 through k (i.e., $E_{pk}\{IT_1\}, E_{sk}\{ID_1\} \ldots E_{pk}\{IT_k\}, E_{sk}\{ID_k\}$).

Figure 3:
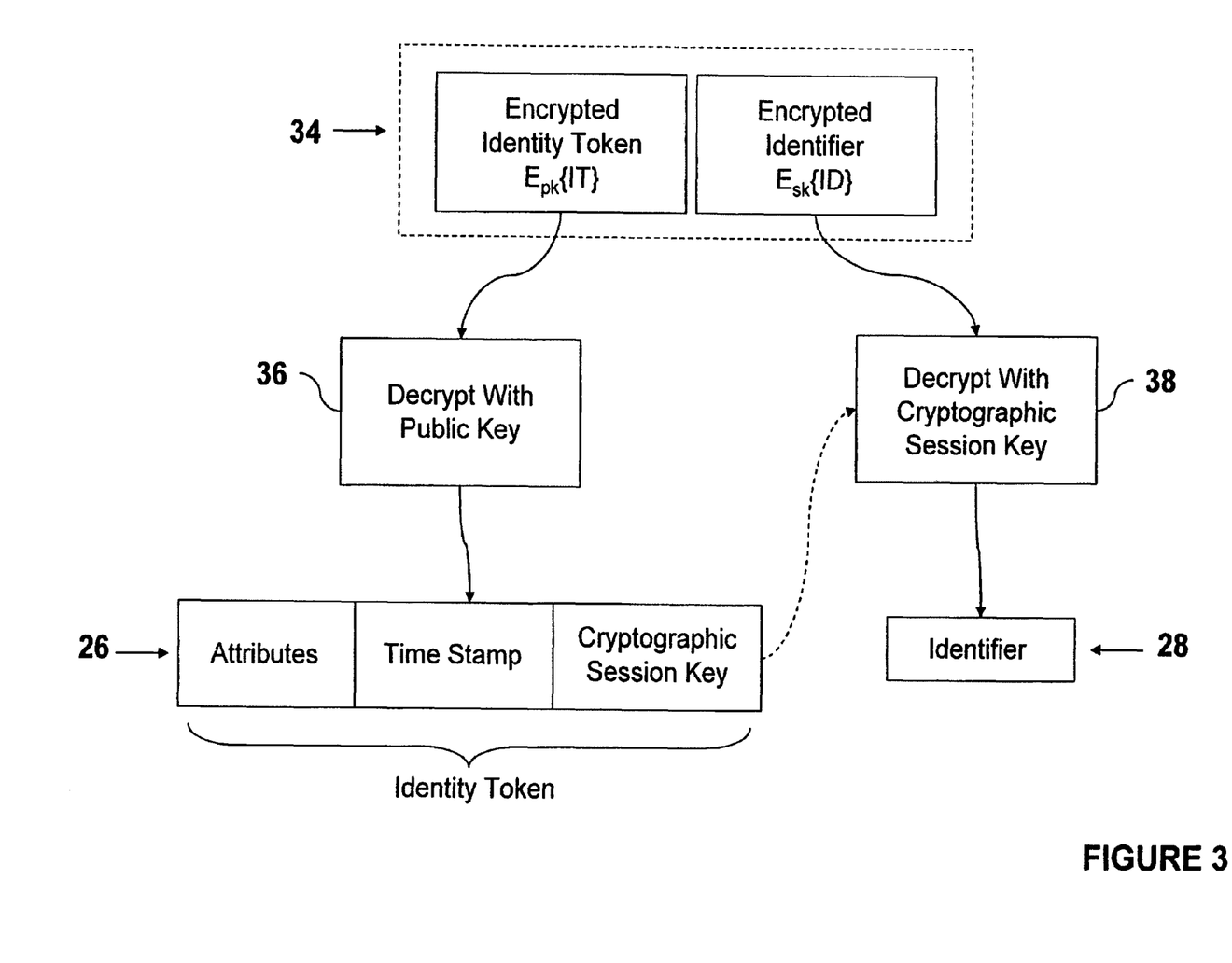
FIG. 3 is an illustration of an exemplary decryption of the encrypted identity token and the encrypted identifier.

The message is provided to the server processor 20. In accordance with the exemplary scenario, the encrypted identity token, $E_{pk}\{IT\}$, and the encrypted identifier, $E_{sk}\{ID\}$, are provided to the publisher. The encrypted portions of the message are decrypted and processed. FIG. 3 is an illustration of an exemplary decryption of the encrypted identity token and the encrypted identifier. The message 34 is parsed into the encrypted identity token, $E_{pk}\{IT\}$, and the encrypted identifier, $E_{sk}\{ID\}$. The encrypted identity token, $E_{pk}\{IT\}$, is decrypted with the respective public key of the public-key cryptographic key pair, as depicted in by block 36. A public key can be obtained in a variety of ways. For example, a public key can be furnished via a registration process. As another example, a public key can be obtained via a directory service. The cryptographic session key is obtained from the decrypted identity token 26 and utilized to decrypt the encrypted identifier, $E_{sk}\{ID\}$, as shown in block 38. The identifier 28 is verified to determine the validity of the digital identity. Any appropriate verification means can be employed. The identifier 28 can be verified, for example, by comparing it to an expected value of the identifier. If the identifiers match, the transaction proceeds normally. If the identifiers do not match, the transaction is halted.

Figure 4:
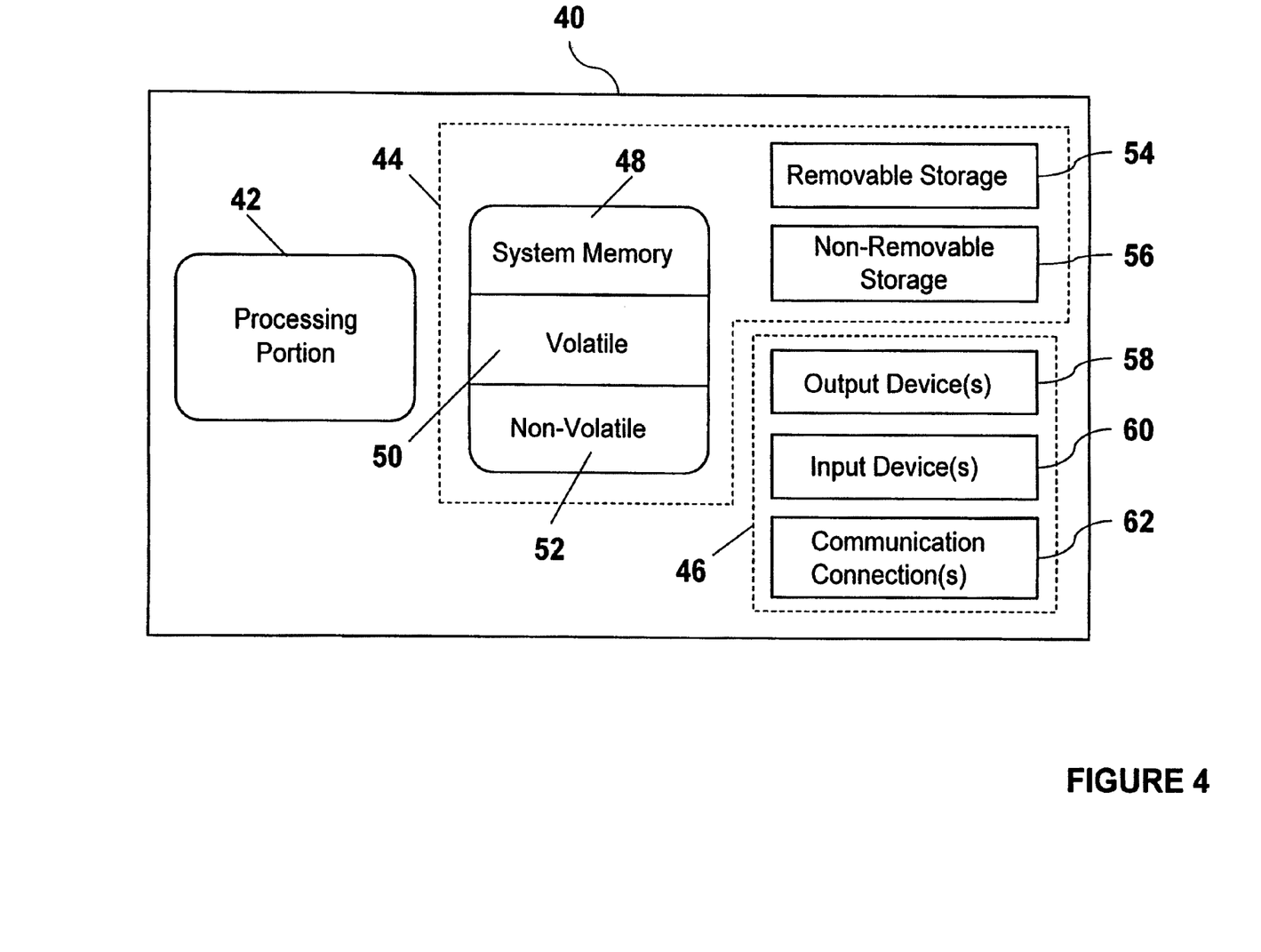
FIG. 4 is a diagram of an exemplary computing device comprising the secure roaming device.

FIG. 4 is a diagram of an exemplary computing device 40 comprising the secure roaming device. In an exemplary embodiment, the functionality of the secure roaming device is distributed throughout the computing device 40. In another exemplary embodiment, the secure roaming device (e.g., secure roaming device 12) is implemented in the form of removable storage 54.

The computing device 40 comprises a processing portion 42, a memory portion 44, and an input/output portion 46. The processing portion 42, memory portion 44, and input/output portion 46 are coupled together (coupling not shown in FIG. 4) to allow communications therebetween. The processing portion 42 is capable of receiving, via the input/output portion 46, the bimodal credential for allowing a level of access to attributes of a digital identity. The processing portion 42 processes the bimodal credential to determine the allowable level of access. The processing portion 42 also is capable of receiving, via the input/output portion 46, a request for attributes. The processor portion 42 processes the request for attributes and selects the requested attributes from the memory portion 44. The processing portion 42 further creates the identity token from the selected attributes, the cryptographic session key, and the time stamp. The memory portion 44 is capable of storing all parameters described above.

The computing device 40 can be implemented as a client processor and/or a server processor. In a basic configuration, the computing device 40 can include at least one processing portion 42 and memory 48. Depending upon the exact configuration and type of computing device, the memory 48 can be volatile (such as RAM) 50, non-volatile (such as ROM, flash memory, etc.) 52, or a combination thereof. Additionally, the computing device 40 also can have additional features/functionality. For example, the computing device 40 can include additional storage (removable 54 and/or non-removable 56) including, but not limited to, magnetic or optical disks, tape, flash, or a combination thereof. Computer storage media, such as memory 48, 50, 52, 54, and 56, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 40. Any such computer storage media can be part of the computing device 40.

The computing device 40 can also contain communications connection(s) 62 that allow the computing device 40 to communicate with other devices. Communications connection(s) 62 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The computing device 40 also can have input device(s) 60 such as keyboard, mouse, pen, voice input device, touch input device, etc. Output device(s) 58 such as a display, speakers, printer, etc. also can be included. All these devices are well known in the art and need not be discussed at length here.

Figure 5:
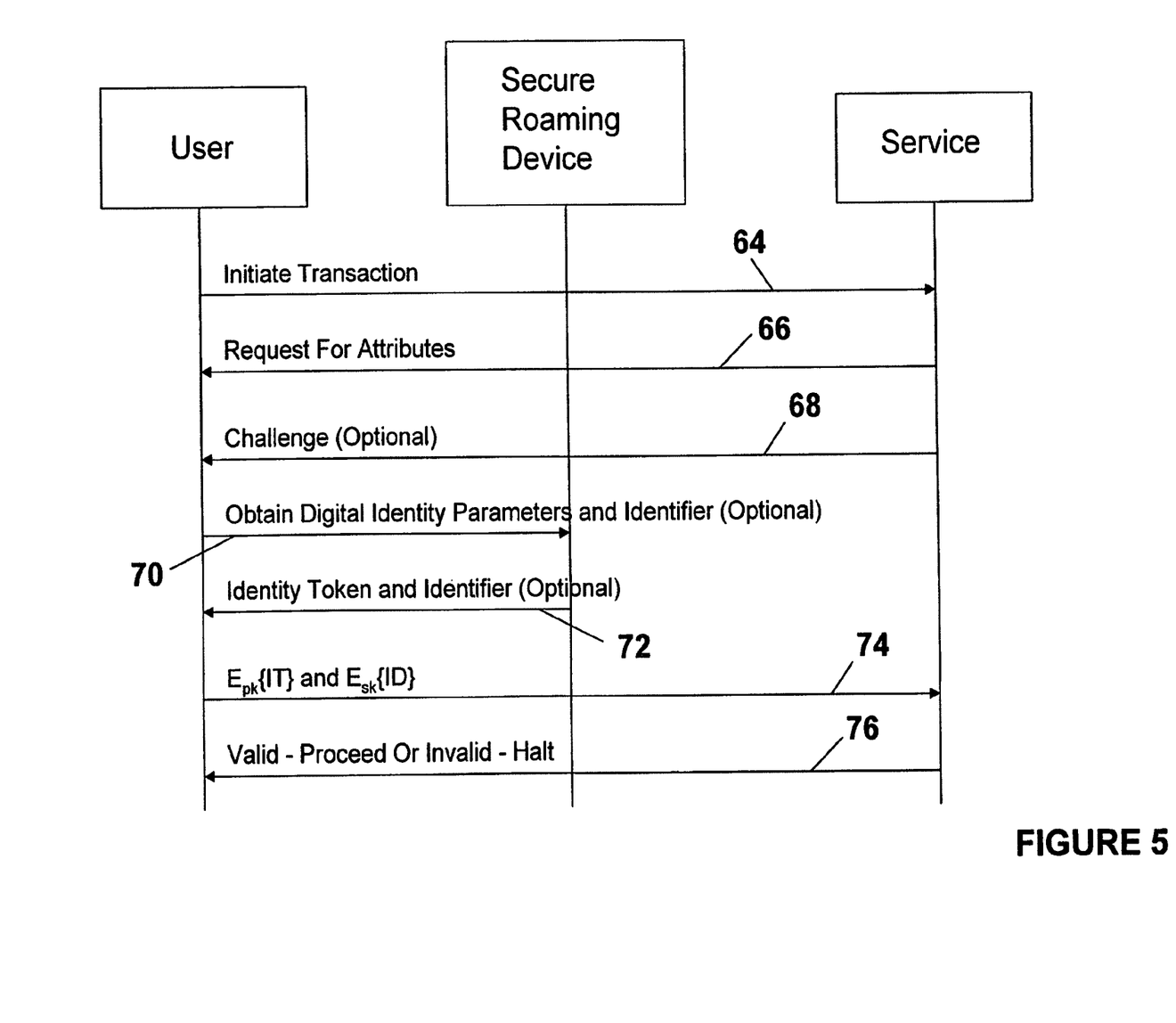
FIG. 5 is a sequential flow diagram of an exemplary sequence of events for securely roaming a digital identity.

FIG. 5 is a sequential flow diagram of an exemplary sequence of events for securely roaming a digital identity. The user initiates a transaction at step 64. In accordance with the exemplary scenario for example, the user sends a request to the publisher to order a book. The service returns a request for information (e.g., attributes) to the user at step 66. Optionally, as described above, the service can challenge the user at step 68. The user obtains the digital identity parameters from the secure roaming device at step 70. Optionally, the user can obtain the identifier, if it is not automatically created in response to a challenge (step 68). Depending upon the processing capability of the secure roaming device, the secure roaming device provides to the client, either the parameters needed to form the identity token and optionally the identifier, or the identity token itself and optionally the identifier at step 72. Further depending upon the processing capabilities of the secure roaming device, the identity token and optionally the identifier can be provided to the user at step 72 in encrypted format. If the identity token and identifier are not encrypted by the secure roaming device, they are encrypted by the user (e.g., by a client processor). Encryption of the identity token and the identifier is as described above. The encrypted identity token, $E_{pk}\{IT\}$ and the encrypted identifier, $E_{sk}\{ID\}$, are provided to the service at step 74. The service determines, as described above, if the identity token and identifier are valid. The service sends a message to the user at step 76 that either the identity token is valid or invalid. If valid, the transaction proceeds, if invalid, the transaction is halted.

Figure 6:
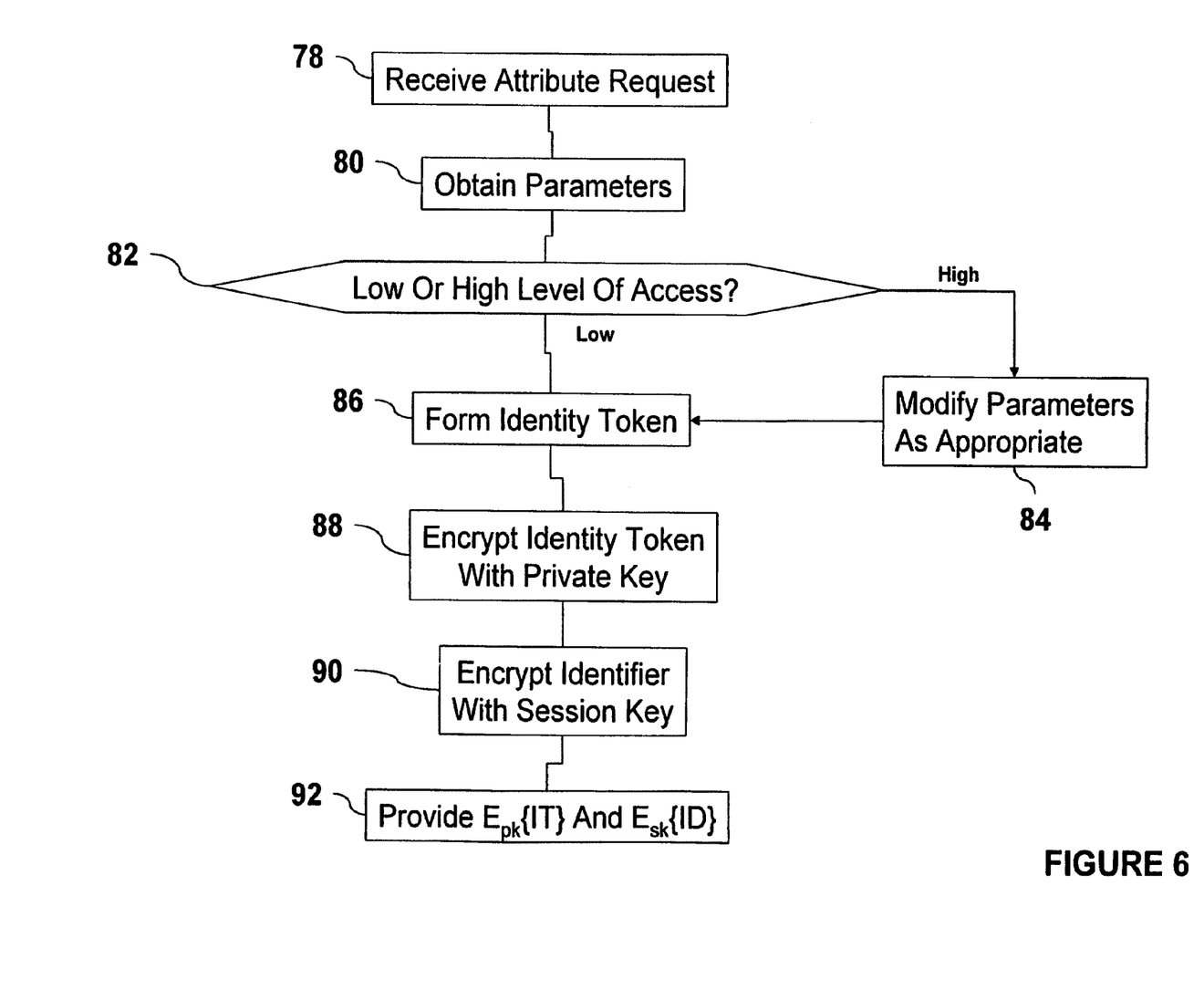
FIG. 6 is a flow diagram of an exemplary process for creating an encrypted identity token and an encrypted identifier.

FIG. 6 is a flow diagram of an exemplary process for creating an encrypted identity token and an encrypted identifier. A request for at least one attribute is received at step 78. Parameters needed to respond to the request, including the requested attribute(s), the cryptographic session key, the time stamp, the private key of a public-key cryptographic key pair, and the identifier are obtained at step 80. At step 82, it is determined if a low or high level of access is granted in accordance with the bimodal credential as described above. If a higher level of access is granted, parameters are modified as appropriate at step 84. If a lower level of access is granted, the identity token is formed from the cryptographic session key, the time stamp, and the appropriate attributes at step 86. The identity token is encrypted utilizing the private key of a public-key cryptographic key pair at step 88. If multiple identity tokens are created, multiple public-key cryptographic key pairs can be utilized. The identifier is encrypted utilizing the cryptographic session key at step 90. If multiple identifiers are encrypted, multiple cryptographic session keys can be utilized. The encrypted identity token, $E_{pk}\{IT\}$, and the encrypted identifier, $E_{sk}\{ID\}$, are provided to the requester at step 92.

Figure 7:
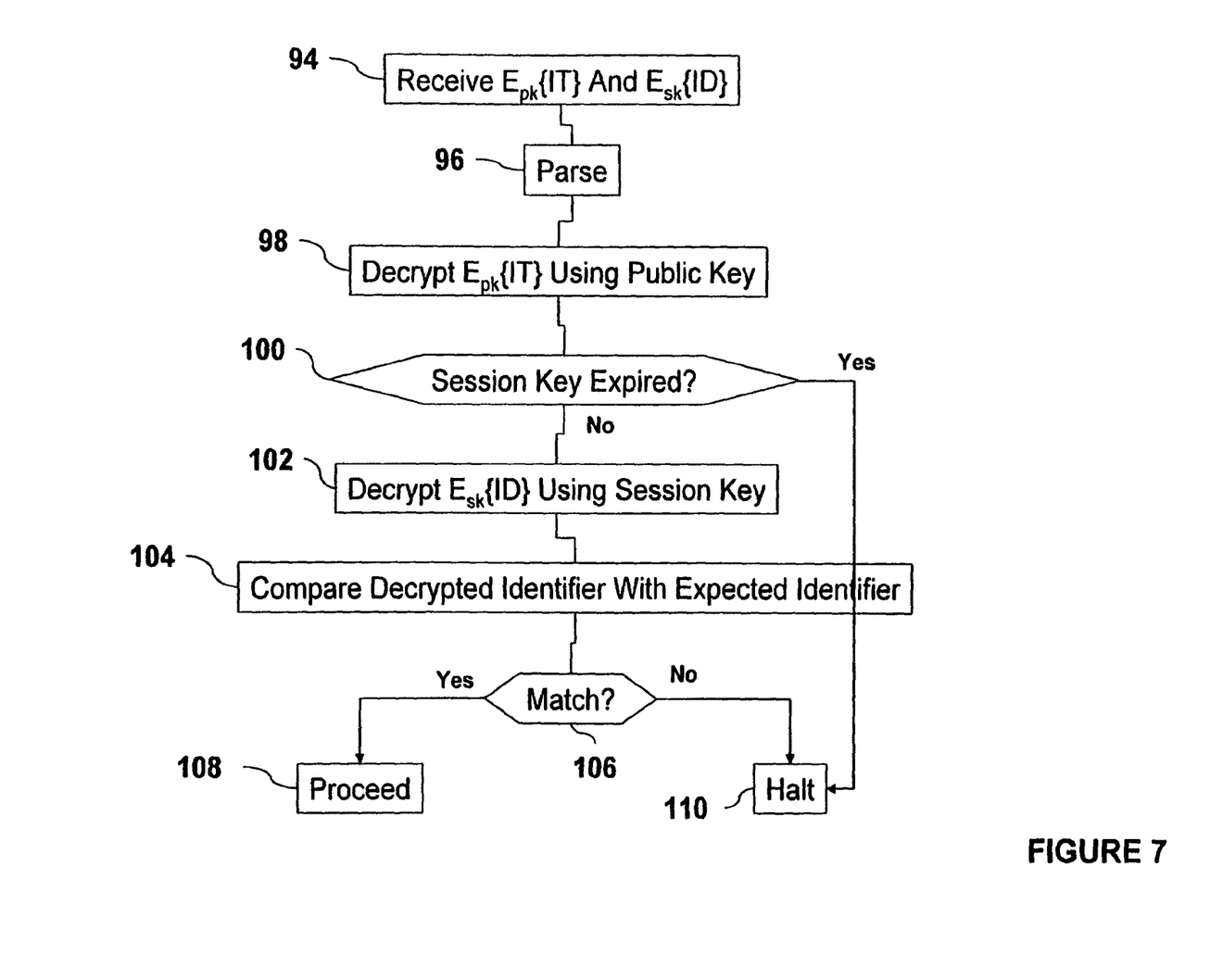
FIG. 7 is a flow diagram of an exemplary process for determining the validity of the identity token.

FIG. 7 is a flow diagram of an exemplary process for determining the validity of the identity token. The encrypted identity token, $E_{pk}\{IT\}$, and the encrypted identifier, $E_{sk}\{ID\}$, are received at step 94. The received encrypted identity token, $E_{pk}\{IT\}$, and the encrypted identifier, $E_{sk}\{ID\}$, are parsed into respective components at step 96. The encrypted identity token, $E_{pk}\{IT\}$, is decrypted utilizing the respective public key at step 98. If multiple encrypted identity tokens are decrypted, multiple respective public keys can be utilized. The time stamp is analyzed to determine if the cryptographic session key has expired at step 100. If the cryptographic session key has expired, the transaction is halted at step 110. If the cryptographic session key has not expired, the encrypted identifier, $E_{sk}\{ID\}$, is decrypted utilizing the cryptographic session key obtained from the decrypted identity token at step 102. If multiple identifiers are decrypted, multiple cryptographic session keys can be utilized. The decrypted identifier is compared with an expected identifier at step 104. The expected identifier can be a predetermined identifier. In an exemplary embodiment, the expected identifier is the challenge response calculated in accordance with a predetermined algorithm. If the decrypted identifier matches the expected identifier (step 106), the transaction proceeds at step 108. If the decrypted identifier does not match the expected identifier (step 106), the transaction is halted at step 110.

In accordance with the methods and apparatuses for securely roaming a digital identity as described herein, a portable device, such as a biometrically protected memory device, can be utilized with a target service. Alternatively, the functionality of the portable device can be incorporated into a processor, such a laptop, or the like. A user can have numerous digital identities. Each digital identity can be associated with a respective public-key cryptographic key pair, and respective session keys. The user's digital identities can be stored in the secure roaming device and carried around such that the user can employ those identities with target services from any client computer system, including systems such as public kiosks that are not fully trustworthy.

The secure roaming device can be operated in two modes in accordance with a bimodal credential. Each mode allows a different level of access to information in the secure roaming device. In the lower level of access mode, which can be considered a safe mode, a digital identity of the user residing on the secure roaming device is provided in the form of an encrypted identity token. No direct access to information such as the public-key cryptographic keys, the cryptographic session key, or certain identity attributes is allowed.

In the higher level of access mode, which can be considered an administrative mode, the digital identities on the secure roaming device can be managed, modified, and moved on or off the secure roaming device. In the higher level of access mode, information such as the public-key cryptographic keys, the cryptographic session key, or identity attributes can be directly accessed for management, and can be moved/copied on and off the secure roaming device. The two modes of the device are protected by different modes of a bimodal credential. For example, one password can unlock the safe mode and another password can unlock the administrative mode.

The various techniques described herein may be implemented in connection with hardware or software or, where appropriate, with a combination of both. Thus, the methods and apparatuses for securely roaming a digital identity or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for securely roaming a digital identity. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatuses for securely roaming a digital identity also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for performing a search utilizing a probabilistic index. When implemented on a general-purpose processor, the program code combines with the processor to provide a unique apparatus that operates to invoke the functionality for securely roaming a digital identity. Additionally, any storage techniques used in connection with securely roaming a digital identity can invariably be a combination of hardware and software.

While methods and apparatuses for securely roaming a digital identity have been described in connection with the illustrative embodiments of the various figures, it is to be understood that other similar embodiments may be used or modifications and additions may be made to the described embodiments for performing the same function for securely roaming a digital identity without deviating therefrom. Therefore, methods and apparatuses for securely roaming a digital identity should not be limited to any single embodiment, but rather should be construed in breadth and scope in accordance with the appended claims.

What is claimed is:

1. A computer-implemented method for securely roaming a digital identity stored on a secure roaming device, wherein the secure roaming device stores encrypted attributes of the digital identity accessible using a bimodal credential, the method comprising:
   receiving a first request for at least one attribute of the digital identity from a first service provider;
   receiving a first password of the bimodal credential at the secure roaming device, wherein the first password allows a safe mode of access to the digital identity;
   providing safe access to a first encrypted identity token, wherein the first encrypted identity token comprises:
      a first cryptographic session key; and
      the at least one attribute of the digital identity, wherein the at least one attribute comprises private identity information;
   providing safe access to a first encrypted identifier, wherein the first encrypted identifier is encrypted with the first cryptographic session key; and
   transmitting the first encrypted identity token and the first encrypted identifier to the first service provider.

2. The computer-implemented method of claim 1, wherein the first encrypted identifier is associated with the first service provider and is used to validate the first encrypted identity token.

3. The computer-implemented method of claim 1, further comprising:
   receiving a second request for the at least one attribute of the digital identity from a second service provider;
   receiving the first password of the bimodal credential at the secure roaming device, wherein the first password enables a safe mode of access to the digital identity;
   providing safe access to a second encrypted identity token, wherein the second encrypted identity token comprises:
      a second cryptographic session key; and
      the at least one attribute of the digital identity, wherein the at least one attribute comprises private identity information;
   providing safe access to a second encrypted identifier, wherein the second encrypted identifier is encrypted with the second cryptographic session key; and
   transmitting the second encrypted identity token and the second encrypted identifier to the second service provider.

4. The computer-implemented method of claim 3, wherein the second encrypted identifier is associated with the second service provider and is used to validate the second encrypted identity token.

5. The computer-implemented method of claim 1, further comprising:
   receiving a second password of the bimodal credential at the secure roaming device, wherein the second password enables an administrative mode of access to the digital identity;
   receiving modifications to the at least one attribute of the digital identity;
   encrypting the modified at least one attribute of the digital identity and the first cryptographic session key to form a modified first encrypted identity token; and
   transmitting the modified first encrypted identity token to the first service provider.

6. The computer-implemented method of claim 5, wherein the administrative mode of access to the digital identity allows access to data values associated with the at least one attribute.

7. The computer-implemented method of claim 1, wherein the safe mode of access to the digital identity allows access to metadata associated with the at least one attribute, and wherein the safe mode of access to the digital identity disallows access to data values associated with the at least one attribute.

8. The computer-implemented method of claim 1, wherein the secure roaming device is accessed via an unsecure interface.

9. A secure roaming device, comprising:
   at least one processor; and
   at least one memory, communicatively coupled to the at least one processor and containing computer-readable instructions that, when executed by the at least one processor, perform a method for securely roaming a digital identity stored on a secure roaming device, the method comprising:
      receiving a request for a first attribute and a second attribute of the digital identity from a service provider;
      receiving a first password of a bimodal credential, wherein the first password enables a safe mode of access to the digital identity stored on the secure roaming device, comprising:
         providing safe access to a first encrypted identity token, wherein the first encrypted identity token comprises:
            a cryptographic session key; and
            the first attribute of the digital identity, wherein the first attribute comprises private identity information;
      receiving a second password of the bimodal credential, wherein the second password enables an administrative mode of access to the digital identity stored on the secure roaming device, comprising:

receiving modifications to the second attribute of the digital identity; and encrypting the second attribute of the digital identity and the cryptographic session key to form a second encrypted identity token; and transmitting the first encrypted identity token and the second encrypted identity token to the service provider.

10. The secure roaming device of claim 9, further comprising:

providing an encrypted identifier from the secure roaming device, wherein the encrypted identifier is encrypted with the cryptographic session key, and wherein the encrypted identifier is associated with the service provider and is used to validate the first encrypted identity token and the second encrypted identity token.

11. The secure roaming device of claim 9, wherein the safe mode of access to the digital identity allows access to metadata associated with the first attribute, and wherein the safe mode of access to the digital identity disallows access to data values associated with the first attribute.

12. The secure roaming device of claim 9, wherein the administrative mode of access to the digital identity allows access to data values, associated with the first attribute and the second attribute.

13. The secure roaming device of claim 9, wherein the secure roaming device comprises at least one of a portable secure roaming device, a flash memory device, and a biometric memory device.

14. The secure roaming device of claim 9, wherein the secure roaming device is accessed via an unsecure interface.

15. A computer storage device storing computer-executable instructions for performing a method of securely roaming a digital identity, the method comprising:

receiving a request for a first attribute of the digital identity from a service provider;

receiving a first password of a bimodal credential at the secure roaming device, wherein the first password enables a safe mode of access to the digital identity;

providing safe access to an encrypted identity token, wherein the encrypted identity token comprises:
a cryptographic session key; and
the first attribute of the digital identity, wherein the first attribute comprises private identity information;

providing safe access to an encrypted identifier, wherein the encrypted identifier is encrypted with the cryptographic session key; and transmitting the encrypted identity token and the encrypted identifier to the service provider.

16. The computer storage medium of claim 15, wherein the encrypted identifier is associated with the service provider and is used to validate the encrypted identity token.

17. The computer storage medium of claim 15, further comprising:

receiving a second request for a second attribute of the digital identity from the service provider;

receiving a second password of the bimodal credential, wherein the second password enables an administrative mode of access to the digital identity;

receiving data values associated with the second attribute of the digital identity;

encrypting the second attribute of the digital identity and the cryptographic session key to form a second encrypted identity token; and transmitting the second encrypted identity token to the service provider.

18. The computer storage medium of claim 15, wherein the safe mode of access to the digital identity allows access to metadata associated with the first attribute, and wherein the safe mode of access to the digital identity disallows access to data values associated with the first attribute.

19. The computer storage medium of claim 17, wherein the administrative mode of access to the digital identity allows modification of data values associated with the first attribute and the second attribute.

20. The computer storage medium of claim 15, wherein the secure roaming device is accessed via an unsecure interface.

* * * * *

UNITED STATES PATENT AND TRADEMARK OFFICE
CERTIFICATE OF CORRECTION

| | | |
|---|---|---|
| PATENT NO. | : 8,051,469 B2 | Page 1 of 1 |
| APPLICATION NO. | : 12/620444 | |
| DATED | : November 1, 2011 | |
| INVENTOR(S) | : John P. Shewchuk et al. | |

It is certified that error appears in the above-identified patent and that said Letters Patent is hereby corrected as shown below:

In column 3, line 2, delete "faun" and insert -- form --, therefor.

In column 11, line 24, in Claim 12, delete "values," and insert -- values --, therefor.

Signed and Sealed this

Sixth Day of December, 2011

David J. Kappos
*Director of the United States Patent and Trademark Office*